May 18, 1954
W. P. DUNPHY
2,678,539
HYDRAULIC PULSATOR TYPE REMOTE CONTROL
WITH FLUID LOCKING MEANS
Filed Feb. 2, 1953
3 Sheets-Sheet 3
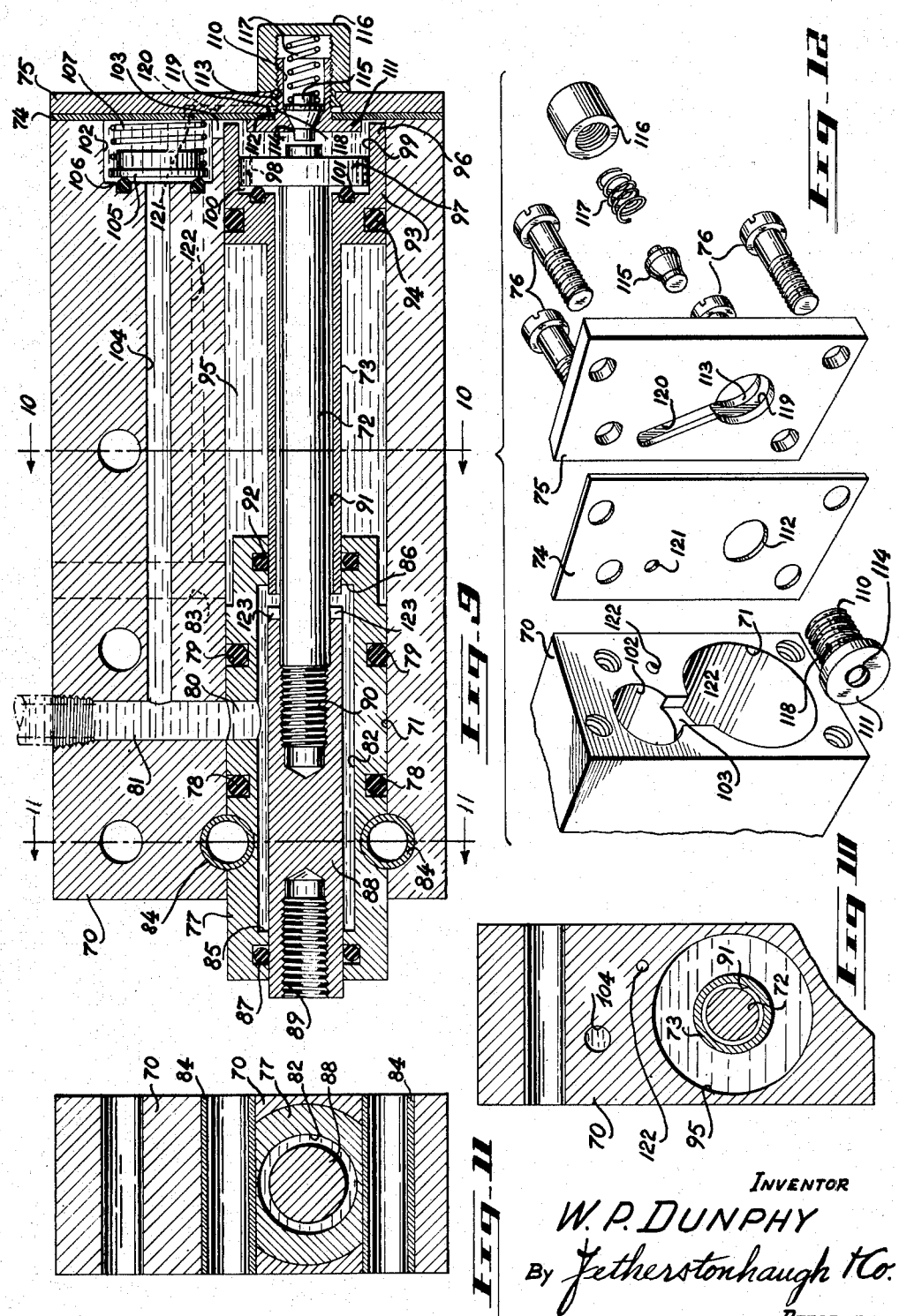
INVENTOR
W. P. DUNPHY
By Fetherstonhaugh & Co.
ATTORNEY Patented May 18, 1954

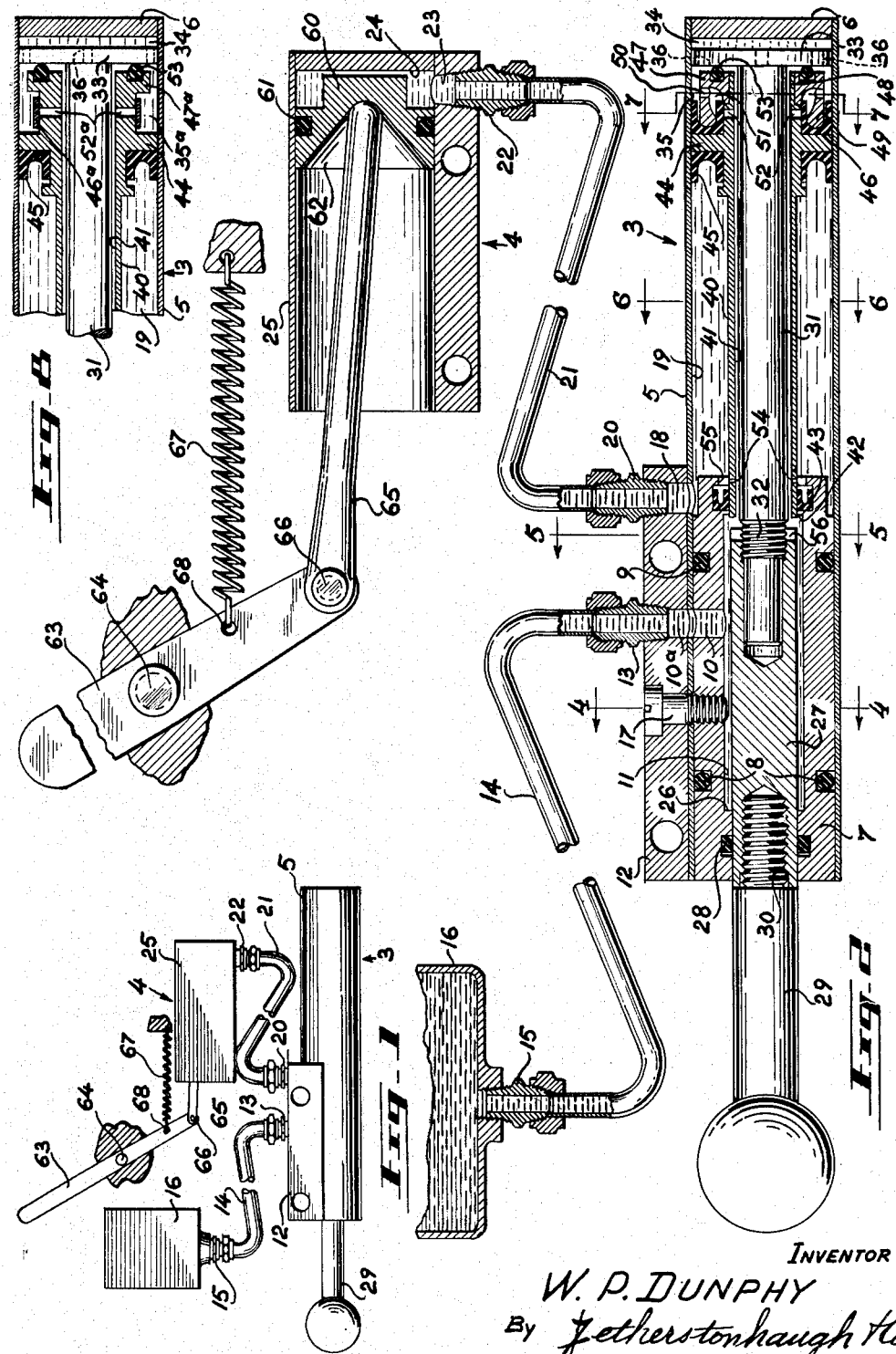

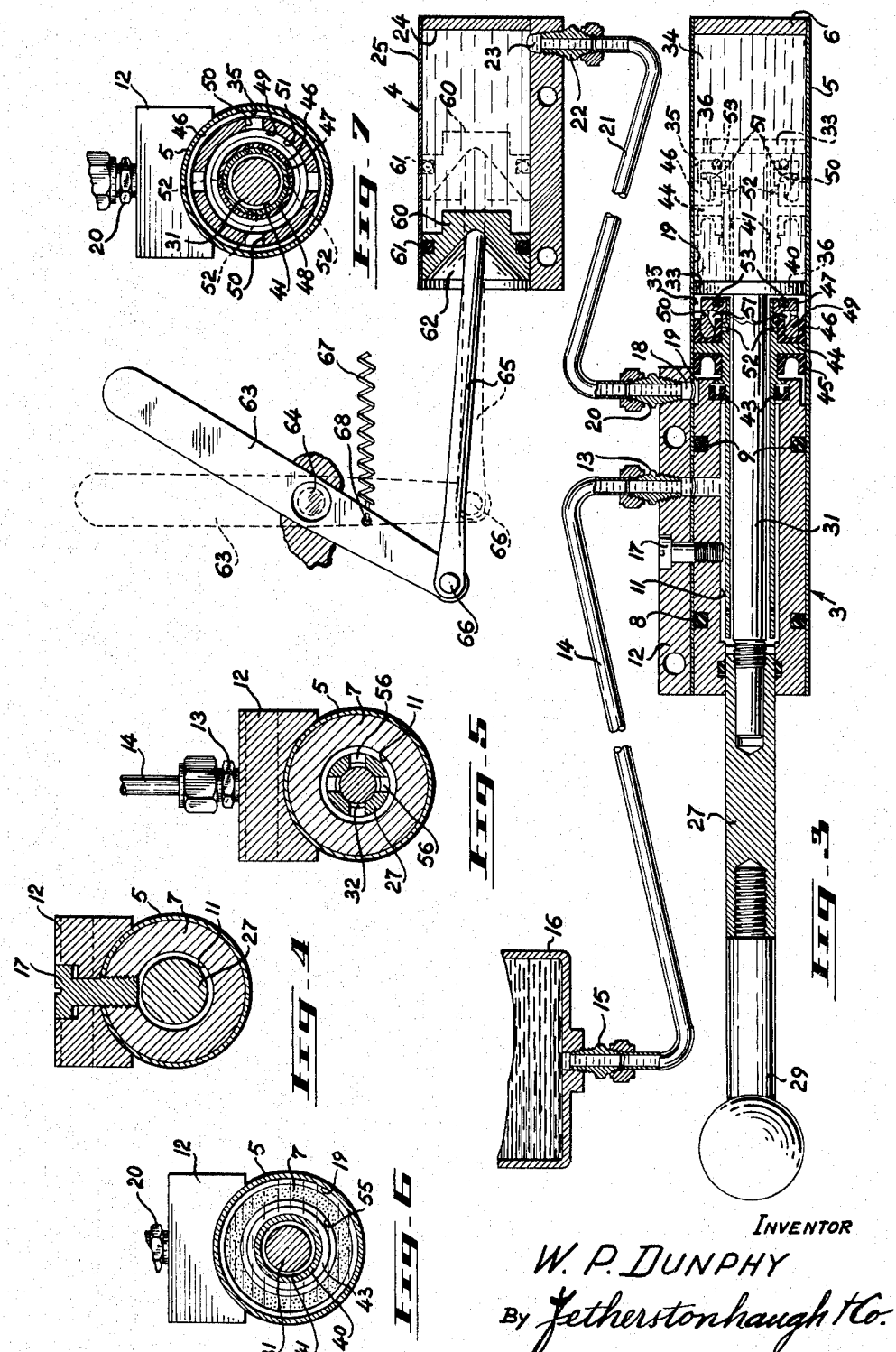

2,678,539

UNITED STATES PATENT OFFICE 2,678,539

HYDRAULIC PULSATOR TYPE REMOTE CONTROL WITH FLUID LOCKING MEANS

William P. Dunphy, Pointe Claire, Quebec, Canada

Application February 2, 1953, Serial No. 334,625

11 Claims. (Cl. 60—54.5)

This invention relates to improvements in hydraulic remote control assemblies, and in particular to hydraulic remote control assemblies capable of being releasably locked at predetermined positions against external pressure.

A particular object of this invention is to provide a hydraulic remote control assembly which comprises a force transmitting unit and a force receiving unit against which a remote control device applies a pressure load, the force transmitting unit being connected to the force receiving unit for the application of hydraulic pressure from the force transmitting unit in order to move the control device against the pressure load, the force transmitting unit including a cylinder, a piston slidable therein and dividing the cylinder into a receiving unit actuating chamber containing a fluid which is compressible against the force receiving unit in response to movement of the piston in one direction and a second chamber communicating with a separate fluid source of supply the fluid from which is drawn into the second chamber under reduced pressure conditions in said last mentioned chamber resulting from said movement of the piston, and a valve closable in response to pressure load applied to the force receiving unit against the fluid in the receiving unit actuating chamber of the force transmitting unit cylinder to retain the fluid in said second chamber for resisting counter movement of said piston and to thereby lock the remote control device in the position predetermined by said movement of the piston in said force transmitting unit.

The above and other objects as well as the characteristic features of this invention will be understood more readily from the following detailed description taken in connection with the accompanying drawings, in which—

Fig. 1 is an elevational view of a remote control assembly embodying my invention.

Fig. 2 is an enlarged view in section of my apparatus shown in Fig. 1.

Fig. 3 is a view similar to Fig. 2 but showing the working parts in different positions.

Fig. 4 is a sectional view taken along the lines 4—4 of Fig. 2.

Fig. 5 is a sectional view taken along the lines 5—5 of Fig. 2.

Fig. 6 is a sectional view taken along the lines 6—6 of Fig. 2.

Fig. 7 is a sectional view taken along the lines 7—7 of Fig. 2.

Fig. 8 is a fragmentary view in section showing a modification of my force transmitting unit.

Fig. 9 is a side view in section of a further modification of my force transmitting unit.

Fig. 10 is a sectional view taken along the lines 10—10 of Fig. 9.

Fig. 11 is a sectional view taken along the lines 11—11 of Fig. 9.

Fig. 12 is an exploded view showing in detail one end of the force transmitting unit of Fig. 9.

Referring more particularly to Figs. 1 to 7 of the drawings, 3 generally designates a transmitter unit and 4 a receiver unit of a control apparatus. Transmitter unit 3 comprises a tubular piston housing 5, closed at one end by a head 6, and at the other end by a seal housing 7 slidably fitted therein. Seal housing 7 is provided with two spaced annular recesses which receive spaced sealing rings 8 and 9. Rings 8 and 9 provide a sealing means against the inner surface of piston housing 5 on either side of a port 10 through piston and seal housings 5 and 7 which communicates with a cylindrical chamber 11 in seal housing 7. A block 12 mounted on piston housing 5 is provided with a port 10a forming a continuation of port 10 and is adapted to receive a nipple 13. A fluid supply line 14 is connected at one end to nipple 13 and at the other end to a second nipple 15 received in an opening provided in a fluid reservoir 16. A cap screw 17 extending through block 12 and piston housing 5 is threadedly received in seal housing 7 to secure them in position. A second port 18 extends through block 12 and piston housing 5 on the side of sealing ring 9 remote from port 10 and in direct communication with a chamber 19. A nipple 20, which is received in the outer end of port 18, is connected to one end of a fluid supply line 21 to the receiver unit 4. The other end of line 21 is connected to a second nipple 22 which is received in a port 23 which is in communication with a chamber 24 in cylinder 25 of receiver unit 4, hereinafter more fully described.

The outer end of seal housing 7 is provided with an internal shoulder 26 forming a restricted passage through which a connector 27 is slidable for movement in the longitudinal direction of seal housing chamber 11. The inner surface of shoulder 26 is recessed to receive a sealing ring 28 which closes the outer end of chamber 11 while permitting sliding movement of the connector through the shoulder 26. An operating shaft 29 is screw-threaded into the outer end of connector 27, as indicated at 30.

A piston stem 31 has one end threadedly secured at 32 in the end of connector 27 remote from shaft 29. Stem 31 is provided at its outer end with a piston head 33 which is slidable along the inner surface of piston housing 5 intermediate the head 6 and seal housing 7. Piston head 33 divides housing 5 into two chambers 34 and 35 and is provided with ports 36 in communication with chambers 34 and 35.

A piston sleeve 40 is concentrically arranged in chamber 19 about piston stem 31 and in spaced relation to stem 31 so as to provide an annular passage 41 therebetween in communication with seal housing chamber 11 at one end thereof and with chamber 35 at the other end thereof. Piston sleeve 40 is slidable relative to piston stem 31 and into chamber 11 through the inner surface of an internal shoulder 42 of seal housing 7 at the inner end of chamber 11. A U-cup seal 43 is fitted in an annular recess in shoulder 42 and about sleeve 40 to provide a seal between chambers 11 and 19 while at the same time permitting sliding movement of sleeve 40 through shoulder 42. Piston sleeve 40 is provided with a piston head 44 having a U-cup seal 45 arranged on the inner side to prevent fluid escape from chamber 19 to chamber 35, and a second U-cup seal 46 arranged on the outer side to prevent fluid escape from chamber 35 to chamber 19. A cap 47 is fitted about a forward extension 48 of piston sleeve head 44. Cap 47 is provided with a rearwardly directed flange 49 which projects into the recess of cup seal 46. Flange 49 is provided with circumferentially spacer ports 50 which communicate between chamber 35 and an inner chamber 51 defined by sleeve extension 48, cap 47 and flange 49. Sleeve head extension 48 is also provided with circumferentially spaced ports 52 communicating between the annular space 41 and inner chamber 51. These ports 52 are normally closed against fluid passage from chamber 51 to the annular space 41 by the inner flange of U-cup seal 46. The outer face of cap 47 is provided with a recess into which a sealing ring 53 is fitted so that, when abutting the opposing face of piston head 33, fluid flow from chamber 35 to annular space 41 is cut off between said cap and the opposing face of piston head 33. Circumferentially spaced ports 54 extend through sleeve 40 adjacent the inner end thereof which are communicable with chamber 19 and annular passage 41 when the piston sleeve head 44 is moved to the end of piston housing 5 remote from the seal housing 7. An annular recess 55 at the outer end of shoulder 42, opening into chamber 19 establishes the communication between chamber 19 and annular passage 41 slightly in advance of the final movement of the sleeve head 44 to its most remote position from the seal housing 7. The length of sleeve 40 is such that, when the head 44 is butted against piston head 33, there will be a slight gap between the inner end of said sleeve and the opposing end of connector 27. The said opposing end of connector 27 is provided with radially extending recesses 56 which are open at the end face of the connector to maintain communication between passage 41 and seal housing chamber 11 when the sleeve is butted thereagainst.

Receiver unit cylinder 25 has a piston 60 therein provided with a sealing ring 61 for sliding contact with the inner surface of said cylinder. The outer face of piston 60 is conically concave, as indicated at 62. A lever 63, which is pivotally mounted at 64 intermediate its length, has a connecting rod 65 pivotally connected thereto at 66. The inner end of connecting rod 65 is received in the conically concaved face 62 of piston 60. A spring 67 is connected at 68 to said lever 63 intermediate the pivotal connections 64 and 66 to urge rod 65 against the outer face of piston 60.

In operation, when it is desired to actuate lever 63, for example to advance a throttle or other device (not shown) which would be connected to the free end of lever 63, operating shaft 29 of transmitter unit 3 is pulled outwardly, as illustrated by full lines in Fig. 3. This action causes outward movement of connector 27 through shoulder 26 and movement of piston head 33 toward seal housing 7. Piston head 33 acting against the piston head 44 of sleeve 40 carries said sleeve along therewith, sealing port 54 when it passes through U-cup seal 43 in the shoulder 42 of seal housing 7. The fluid in chamber 19 is then forced through port 18 and supply line 21 into chamber 24 of receiver unit cylinder 25 to move piston 60 which rotates lever 63 about its axis 64 through pressure on connecting rod 65 against the biasing of spring 67. At the same time the said movement of piston head 33 reduces the pressure in chamber 34 and consequently in chambers 35 and 51 to such an extent that the flanges of U-cup seal 46 collapse to permit fluid from reservoir 16 to flow through supply line 14, port 10, chamber 11, annular passage 41, ports 52 past the collapsed U-cup seal 46 flanges, into inner chamber 51, thence through ports 50 into chamber 35 and through ports 36 to fill the chamber 34.

When outward pull on operating shaft 29 is released, the biasing of spring 67 tends to rotate lever 63 to move piston 60 in a direction which would cause return flow of the fluid to chamber 19. However, pressure on sleeve head 44 causes the fluid in chambers 34, 35 and 51 to apply sealing pressure on the flanges of U-cup seal 46, to close off port 52. Sealing ring 53 bearing against piston head 33 also prevents flow of fluid between cap 47 and piston head 33 to annular passage 41. Thus the fluid trapped in chamber 34 resists return movement of piston head 33 which in turn holds piston sleeve head 44 against movement which would allow the fluid to flow from chamber 24 of cylinder 25. The fluid trapped in chamber 24 holds piston 60 of receiver unit 4 in any position predetermined by the distance which piston sleeve head 44 of transmitter unit 3 is moved toward seal housing 7 under the influence of operating handle 29, as illustrated in Fig. 3, and thereby locks lever 63 in a desired position against the biasing of spring 67.

In order to return lever 63 towards its starting position, operating shaft 29 is given reverse movement to thereby move connector 27 through shoulder 26 and into chamber 11 as well as to cause piston head 33 to travel toward the head 6 of piston housing 5. As will be seen in dotted line of Fig. 3 this movement causes piston head 33 to advance ahead of piston sleeve head 44, providing a gap between cap 47 and the opposing surface of piston head 33 by breaking the seal provided by sealing ring 53. Fluid is thereby permitted to flow from chamber 34 via port 36, through said gap into annular passage 41 to chamber 11 and finally to reservoir 16. As the pressure is also reduced in chamber 35 against the outer face of piston sleeve head 44, the sleeve head is free to move in the direction of piston 33. The biasing spring 67 overcomes the opposing resistance of the fluid in chamber 24 and piston 60 is forced inwardly so that the fluid is reverse flowed into chamber 19 to cause said movement of the piston sleeve head 44 towards piston head 33. Continued movement of piston head 33 and sleeve head 44 returns all moving parts to the position shown in Fig. 2, until port 54 in sleeve 40 passes under seal 43 to re-establish communication between chamber 19 and annular passage 41.

If after having moved piston head 33 and piston sleeve head 44 toward seal housing 7 to thereby rotate lever 7 against the biasing of spring 67 through the medium of fluid acting against piston 60, the mechanism is maintained in this position for some time, it sometimes happens that, due to fluid leakage, reduction in temperature or some other cause, a reduction in the volume of fluid takes place in chamber 19, chamber 24 and/or the communicating line 21 therebetween. In this event piston 60 of receiver unit 4 will be moved along cylinder 25 under the influence of spring 67 without corresponding movement of piston head 33 and sleeve head 44 of transmitter unit 3 toward the head 6 of piston housing 5. Thus when piston head 33 is moved towards head 6 in response to operating shaft 29, piston 60 will reach the end of its travel before piston head 33. When piston 60 has reached the limit of its travel there will be no more fluid pressure in chamber 19 to cause continuing following movement of piston sleeve head 44. However, as piston head 33 continues to move under the influence of shaft 29 the inner end of connector 27 will move against the opposing end edge of sleeve 40 forcing the sleeve head 44 to continue its following movement. This action will reduce the pressure in chamber 19 causing collapse of seal 43 and passage of fluid into said chamber from reservoir 16. Recesses 56 in the face of connector 27 permit flow of fluid between annular passage 41 and chamber 11 when sleeve 40 is butted against connector 27. In any event when sleeve 40 has travelled to the extent illustrated in Fig. 2, port 54 will be in communication with chamber 19 through recess 55. This permits the lost volume of fluid in the system between chambers 19 and 24 to be replenished from reservoir 16 to synchronize the operation of receiver unit 4 with the operation of transmitter unit 3. Then, too, should there be an excess of fluid in the system between chambers 19 and 24, due to, for example, an increase in temperature causing expansion of the fluid therein, this excess fluid is released when port 54 is aligned with recess 55. This will permit piston 60 to travel the full length of cylinder 25 under the influence of spring 67, resulting in re-synchronization of the operation of transmitter and receiver units 3 and 4.

In Fig. 8, I have illustrated a modified transmitter unit sleeve construction in which the forward extension of head 44 is integrally formed to provide a circumferential shoulder 47a which is spaced from the main flange of head 44. A bandtype seal 46a covers ports 52a to close chamber 35a from annular passage 41 via ports 52a. During outward movement of piston head 33 toward seal housing 7 reduced pressure in chamber 35a permits expansion of band 46a to permit flow of fluid from annular passage 41 into chamber 35a via ports 52a and thence into chamber 34 via ports 36.

Referring now to Figs. 9 to 12 of the drawings, I have shown a further modification of the transmitter unit of my control apparatus. The unit comprises a rectangular piston housing block 70 provided with a cylindrical bore 71 extending longitudinally therethrough into which concentrically arranged piston and sleeve members 72 and 73 are fitted for sliding movement in the longitudinal direction of said bore. Inner and outer end plates 74 and 75 are secured to one end of block 70 by fastening elements 76 and provide a head for bore 71. A seal housing 77, having spaced sealing rings 78 and 79 circumferentially arranged thereabout in recesses provided therefor, is slidably fitted in the opposite end of bore 71 with sealing rings 78 and 79 engaging the inner surface of bore 71. A port 80 through seal housing 77 intermediate sealing rings 78 and 79 communicates with chamber 82 in seal housing 77. Port 80 is aligned with a port 81 extending through block 70 at right angles to bore 71. The outer end of port 81 is connectable to a reservoir 16 in the manner shown in Figs. 1 to 3 inclusive. A second port 83 extends through block 70 at right angles to bore 71 in communication therewith on the side of sealing ring 79 remote from port 80. The outer end of port 83 is connectable to receiver unit 4 in the same manner as illustrated in Figs. 1 to 3. Keys 84 extend through complementary transverse grooves in block 70 and housing 77 to secure them against relative movement when said housing has been fitted in the bore 71 of block 70.

Housing 77 is provided with internal shoulders 85 and 86 at opposite ends of chamber 82. Shoulder 85 is provided with a cylindrical passage having a ring seal 87 recessed therein through which a connector 88 is slidable into chamber 82 in the longitudinal direction thereof. Connector 88 is recessed at its outer end, as indicated at 89, to receive an operating shaft (such as is shown in Figs. 1 to 3, designated 29) in threaded engagement. The inner end of connector 88 is also recessed to receive the threaded end 90 of the stem of piston 72 so that the operating shaft, connector and piston are slidable as a single unit in the manner illustrated in Figs. 1 to 3. Sleeve 73 is concentrically arranged about the passage 91 therebetween which communicates with chamber 82. Sleeve 73 is slidable through a passage in shoulder 86 provided with a recessed ring seal 92 engageable with the outer surface of sleeve 73.

The piston head 93 of sleeve 73 slidably engages the defining wall of bore 71 and has a ring seal 94 recessed therein for contact with the said wall of bore 71 to thereby provide a sealed chamber 95 which is in communication with the chamber of receiver unit 4 (see Figs. 1 to 3) through port 83. The side of piston sleeve head 93 remote from chamber 95 is provided with a tubular extension 96 within which the head 97 of piston 72 is slidable relative thereto. Piston head 97 is provided with ports 98 communicating with outer and inner chambers 99 and 100 on either side of the head 97. A ring seal 101 in the outer face of sleeve head 93 closes inner chamber 100 from annular passage 91 when the opposing face of piston head 97 is butted thereagainst.

Chamber 99 is connected to a secondary chamber 102 thereabove by a communicating passage 103. Chamber 102 is also in communication with port 81 through a second passage 104. Chamber 102 and passage 103 are formed in the end of block 70 to which plates 74 and 75 are secured (see Fig. 12) and are closed at their outer ends by inner plate 74. A valve 105 in chamber 102 (see Fig. 9) is seated against a ring seal 106 in the inner face of chamber 102 to close passage 104 by a light spring 107 arranged between said valve and the opposing surface of plate 74.

In operation, movement of piston head 97, by means of a pull on an operating member at the outer end of connector 88, causes movement of sleeve head 93 toward the inner end of seal housing 77, forcing liquid from chamber 95 through port 83 to actuate receiver unit 4 for rotation of lever 63 against the biasing of spring 67. At the same time pressure in chamber 99 is reduced to the extent that the seal of valve 105 in chamber 102 collapses admitting fluid from the reservoir through port 81, passage 104 and chamber 102 to chamber 99 via passage 103. When outward pull on piston head 97 is released and back pressure in chamber 95 is exerted through the spring biasing of unit 4, pressure is transferred to the fluid in chamber 99 from sleeve and piston heads 93 and 97. This pressure closes valve 105 thereby overcoming the spring biasing pressure on unit 4 so as to prevent rotation of lever 63.

Counter movement of piston head 97 through the medium of an operating member acting against connector 88, causes piston head 97 to move toward plate 74—75 in advance of sleeve 73. The movement breaks the seal 101 in chamber 100 allowing the fluid to flow from chamber 99 through ports 98 and into passage 91 while it is carried to chamber 82. The restraining pressure on the outer face of piston sleeve head 93 having been released, biasing spring is allowed to rotate lever 63 and to force the fluid from chamber 24 of unit 4 into chamber 95. This action in turn causes sleeve head 93 to follow piston head 97.

Plates 74—75 of block 70 carry a resetting valve assembly disposed opposite bore 71. This assembly comprises a tubular member 110 provided with a flange 111 at one end which is inserted through corresponding openings 112 and 113 in plates 74 and 75 with the flange 111 disposed against the inner surface of plate 74. The flanged end of member 110 is provided with a reduced central opening 114 flared at its inner end to receive a valve 115 therein. The tubular member 110 is externally threaded for screw threading a cap 116 thereabout. A spring 117 between cap 116 and valve 115 seats the latter in the central opening 114 of the flanged end of member 110. Member 110 is provided with ports 118 in the side wall thereof which communicate with an annular recess 119 about opening 113 in the inner surface of plate 75. Recess 119 in turn communicates with an elongated recess 120 in the inner surface of plate 75. The end of recess 120 remote from annular recess 119 is open to corresponding passageways 121 and 122 in inner plate 74 and block 70 respectively, the latter passageway 122 being connected at its other end to port 83.

It will be noted that the tubular extension 96 of piston sleeve head 93 is elongated with respect to piston head 97 so that when extension 96 is butted against inner plate 74, head 97, when in sealing engagement with the sleeve head, is spaced inwardly of the protruding portion of valve 115. In the event of reduced fluid pressure between chambers 24 and 95 of the receiver unit 4 and transmitter unit 3, for reasons above stated, sleeve 73 will be carried to the head or starting position by the butting pressure of connector 88 against the inner end of sleeve 73 in the manner aforedescribed. Recesses 123 in the end of connector 88 maintain fluid flow from chamber 82 to annular passage 91 when the sleeve 73 is butted against connector 88. Due to the length of tubular extension 96, sleeve 73 will be stopped before piston head 97 has reached the end of its travel. Continued movement of piston head 97 will apply pressure on valve 115 upsetting the biasing of spring 117 and permitting fluid flow from the reservoir side, past valve 115 and through ports 118, and passages 119, 120, 121 and 122 to port 83 to thereby replenish the fluid between chambers 24 and 95.

Having now described what I believe to be the preferred embodiments of this invention, it will be understood that the illustrations above shown and described may be modified and altered without departing from the scope and spirit of my invention as defined in the appended claims. As an example, the receiver unit 4 may be employed to exert force against any device where it is desirable to move said device to relative positions and maintain them against return movement under a constant biasing load. This constant biasing load may be other than a spring tension, for example, gravity force, air pressure, centrifugal or other constant mechanical force may be applied.

What I claim is:

1. A hydraulic remote control assembly comprising a force transmitting unit, a force receiving unit, a remote control device adapted to apply a pressure load against said force receiving unit, said force transmitting unit being connected to said force receiving unit for the application of hydraulic pressure from said force transmitting unit to said force receiving unit to move said control device against said pressure load, said transmitting unit comprising a cylinder, a piston slidable in said cylinder and dividing said cylinder into a first and second chamber, said first chamber containing a body of fluid and being connected to said force receiving unit for pressure transmission of the fluid in said first chamber against the pressure load of said remote control device to thereby move the latter against its pressure load in response to movement of said piston in one direction, a reservoir containing a second body of fluid communicable with said second chamber, and a valve releasable in response to reduced pressure in said second chamber resulting from said movement of the piston to admit fluid from said reservoir to said second chamber, said valve being closable in response to said pressure load applied against the fluid in said first chamber to resist counter movement of said piston.

2. A hydraulic assembly as set forth in claim 1, including a fluid release mechanism operable to evacuate said second chamber for counter movement of said piston in response to application of said pressure load of said remote control device against said first body of fluid.

3. A hydraulic assembly as set forth in claim 1, in which said force receiving unit comprises a cylinder, a piston movable in said cylinder, said first body of fluid being communicable from the first chamber of said force transmitting unit to one side of said force receiving unit piston for movement of the latter in one direction in response to said movement of the force transmitting unit piston, said remote control device being under pressure load against the opposing side of said force receiving unit piston for counter movement of the latter.

4. A hydraulic assembly as set forth in claim 3, in which said remote control device comprises a lever rotatable about an axis a link pivoted at one end to said lever and adapted to apply pressure against said force receiving unit piston, and means rotating said lever for application of biasing pressure against said force receiving unit piston.

5. In a hydraulic remote control assembly, a force transmitting unit comprising a cylinder having a head at one end thereof and a sealing member closing the other end thereof, a piston head and stem assembly slidable in said cylinder, means engaging the end of said piston stem remote from its head for moving the piston head between said cylinder head and sealing member, a sleeve provided with a head at one end thereof concentrically arranged about said piston stem with said sleeve head adjacent said piston head and for movement relative to said piston, said sleeve and sleeve head being spaced from said stem to provide an annular passage therebetween open at the end remote from the sleeve head, a chamber in said sealing member communicable with said annular passage, a fluid reservoir communicable with said chamber in the sealing member to supply fluid to said annular passage, a second chamber between said piston head and said cylinder head communicable with said passage to receive fluid from said reservoir, a third chamber separated from said second chamber and said passage by said sleeve and sleeve head, said third chamber having a fluid trapped therein for delivery to an external receiving unit, said piston being movable in one direction to engage said sleeve head for movement of same to exert pressure on the fluid in said third chamber against said external receiving unit and to reduce pressure in said second chamber, a valve interposed between said reservoir and said second chamber said valve being collapsible in response to reduced pressure in said second chamber for admission of fluid to said last mentioned chamber from said reservoir during said movement of the piston and sleeve, said valve being adapted to be closed to resist counter pressure exerted on the fluid therein by counter pressure from said external receiving unit acting on the fluid in said third chamber against said sleeve head, a port from said second chamber communicable with said annular passage, means for closing said communication between the second chamber and said passage when said piston is moved the direction aforesaid, said piston being movable in a counter direction relative to said sleeve head to establish communication between said second chamber and said annular passage for release of fluid from said second chamber whereby pressure from said external receiving unit on the fluid in said third chamber is enabled to exert force on said sleeve head for counter movement of the latter in the direction of said counter movement of the piston.

6. A remote control assembly as set forth in claim 5, in which said means engaging the end of said piston stem comprises a shaft slidable through the chamber in said sealing member, said shaft being provided with a shoulder normally spaced from the inner end of said sleeve and being movable to engage said sleeve with counter movement of said piston to apply counter movement force to said sleeve and sleeve head in the event of dissipation of the fluid force in said third chamber against said sleeve head.

7. A remote control assembly, as set forth in claim 5, including a sealing ring interposed between said sealing member and the sleeve to prevent fluid flow between said first and third chambers.

8. A remote control assembly as set forth in claim 7, including a port extending through said sleeve adjacent the inner end thereof to provide fluid flow between said first and third chambers after counter-movement of said sleeve and sleeve head for a predetermined distance of its length of travel.

9. A remote control assembly as set forth in claim 5, in which said sleeve head is provided with a forward extension disposed to project toward said piston head, a sealing ring carried by said forward projection serving to seal fluid passage between said annular passage and said port communicable with same and said second chamber when said piston is moved in the first mentioned direction, a port extending through said forward extension and communicable with said annular passage and said second chamber and a sealing means normally closing said last mentioned port under fluid pressure from said second chamber and collapsible to permit fluid passage from said annular passage to said second chamber under reduced pressure conditions in said second chamber.

10. A remote control assembly as set forth in claim 5, in which said sleeve head is provided with a sealing member in its face opposite said piston head said sealing member normally closing fluid passage from said second chamber to said annular passage during movement of said piston in said first mentioned direction, a secondary chamber communicating with said second chamber, a passage from said secondary chamber to said reservoir and a valve disposed in said secondary chamber to close said last mentioned passage under fluid pressure from said second chamber, said valve being collapsible to admit fluid from said reservoir to said second chamber under reduced pressure conditions in said second chamber.

11. A remote control assembly as set forth in claim 10, including a reset valve assembly in said second chamber and a passage from said second chamber to the compression side of said sleeve head, said reset valve being normally closed to resist fluid passage to and from the compression side of the sleeve head and being actuated by counter movement of said piston to permit fluid passage between said second and third chambers.

No references cited.